United States Patent [19]

Riddel

[11] 4,005,733
[45] Feb. 1, 1977

[54] PRESSURE CONTROL VALVE

[75] Inventor: John W. Riddel, Fenton, Mich.

[73] Assignee: General Motors Corporation, Detroit, Mich.

[22] Filed: Nov. 17, 1975

[21] Appl. No.: 632,399

[52] U.S. Cl. .................. 137/625.4; 137/625.65; 251/141
[51] Int. Cl.² ..................................... F16K 31/06
[58] Field of Search ............... 251/139, 140, 141; 137/625.4, 625.5, 625.65

[56] References Cited
UNITED STATES PATENTS

| 2,267,515 | 12/1941 | Wilcox et al. | 137/625.65 |
| 2,619,116 | 11/1952 | Ralston | 251/139 X |
| 2,860,850 | 11/1958 | Rhodes et al. | 251/139 |
| 2,914,034 | 11/1959 | Becker | 137/625.65 |
| 2,939,673 | 6/1960 | Rosholt | 251/139 |
| 3,001,757 | 9/1961 | Ball | 251/140 |
| 3,422,850 | 1/1969 | Caldwell | 137/625.65 |
| 3,498,330 | 3/1970 | Paige | 137/625.65 |
| 3,726,315 | 4/1973 | Sheppard | 137/625.65 |
| 3,809,123 | 5/1974 | Heimann | 251/141 X |

*Primary Examiner*—Arnold Rosenthal
*Attorney, Agent, or Firm*—D. D. McGraw

[57] ABSTRACT

A differential pressure control valve is solenoid operated on a controlled duty cycle to alternately open and close a pair of inlets to establish a desired outlet pressure. The valve member acts as a solenoid armature. It is of sandwich construction with a magnetically soft center section and a thin, wear-resistant, nonmagnetic coating on one or both sides. The nonmagnetic coatings or layers are disclosed as being made of a nonmagnetic stainless steel, while the center section is disclosed as being made of a low carbon steel having a low magnetic remanence or residual magnetization. Valve life is increased due to the wear resistance of the stainless steel, and the nonmagnetic characteristic of the stainless steel layer adjacent the field plate avoids erratic retention of the valve member against the solenoid core and field plate. The arrangement is such that the magnetic forces across the valve member during solenoid energization act in parallel.

3 Claims, 2 Drawing Figures

PRESSURE CONTROL VALVE

The invention relates to a control valve assembly particularly adapted to control air pressure differential flows and pressures with a valve which opens and closes in a variable duty cycle at variable frequencies. The valve is controlled by a solenoid which is energized and deenergized to establish the duty cycle. The assembly includes differential air pressure inputs disposed in aligned relation on opposite sides of a valve chamber and an air pressure output communicating with the chamber. One of the inputs is through a solenoid core which forms a valve seat. A valve member is positioned in the chamber to close that valve seat when the solenoid is energized, opening a valve seat associated with the other input. When the solenoid is deenergized, the previously open valve seat is closed and the previously closed valve seat is opened. By controlling the percent of time in each duty cycle that a particular valve seat is opened in relation to the percent of time that it is closed, a control pressure of a desired average value intermediate the two pressures provided is established in the valve chamber and transmitted through the output to a mechanism utilizing the pressure. The valve member is formed to provide a solenoid armature. It is of sandwich construction with a major center section of magnetically soft electromagnetic material and has at least one thin outer section of hard nonmagnetic material having high resitance to wear. One of the features of the invention is the arrangement wherein the required one of the outer sections or layers provides a magnetic gap between the major center section and the solenoid core and field plate. This materially contributes to a desirable action in which the valve otherwise would tend to be retained against the valve seat formed by the solenoid core after the solenoid is deenergized due to the magnetic remanence of the materials.

One of the advantages of a construction embodying the invention is the realization of increased valve life as compared to valves which utilized a rubber-like material to close and open valve seats. For example, valves embodying the invention have been operated continuously at thirty operations per second for one thousand hours without any impairment of function or significant deterioration.

The assembly is particularly useful in governors and road speed control systems, and such a use is disclosed in copending patent application Ser. No. 632,398 entitled "Differential Pressure Power Road Speed Control System", filed on even date herewith in the name of John A. Carol, Jr. et al and assigned to the common assignee.

An important feature of the invention is the ability to use non-corrosive magnetically soft material such as nickel for the magnetic center section of the valve member, the lower portion of the solenoid core, and as a coating or layer on the field plate. This is essential when the valve is used in an environment such as that disclosed in the application noted above. That environment includes engine exhaust gases which has a corrosive effect on many materials because it contains a slightly acid water vapor.

IN THE DRAWING

Figure 1:
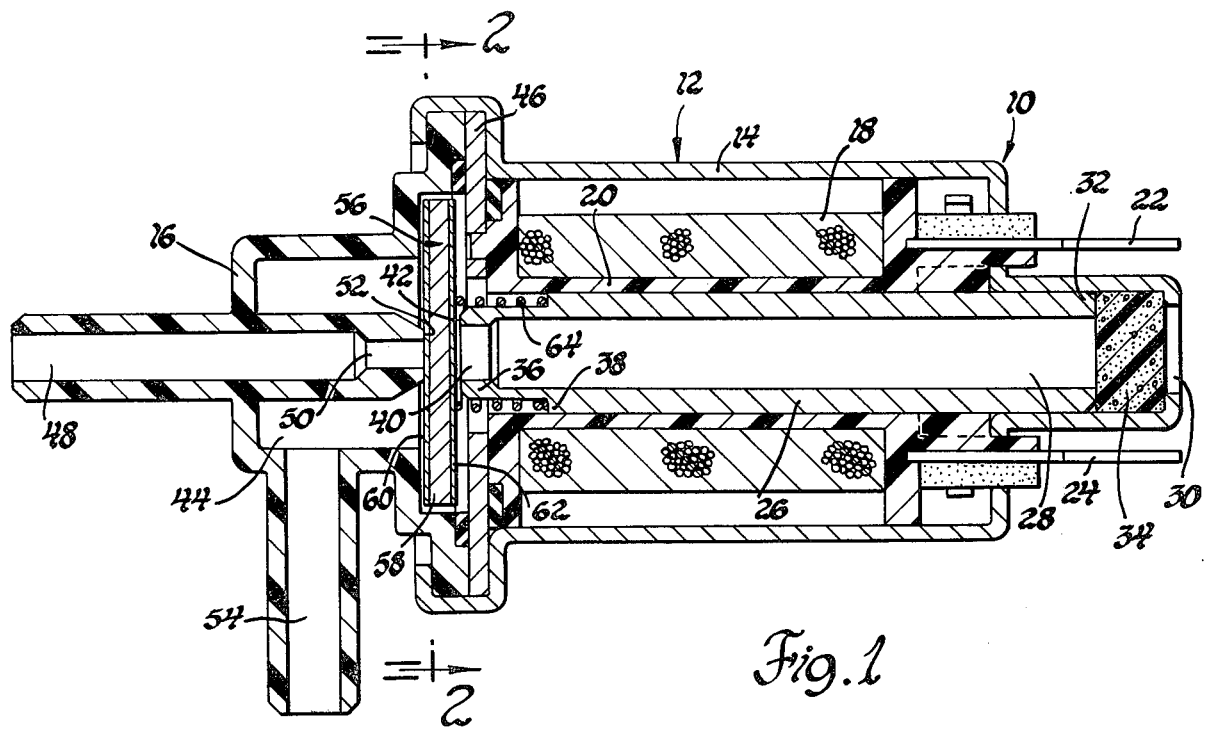
FIG. 1 is a cross section view of a control valve assembly embodying the invention.
Figure 2:
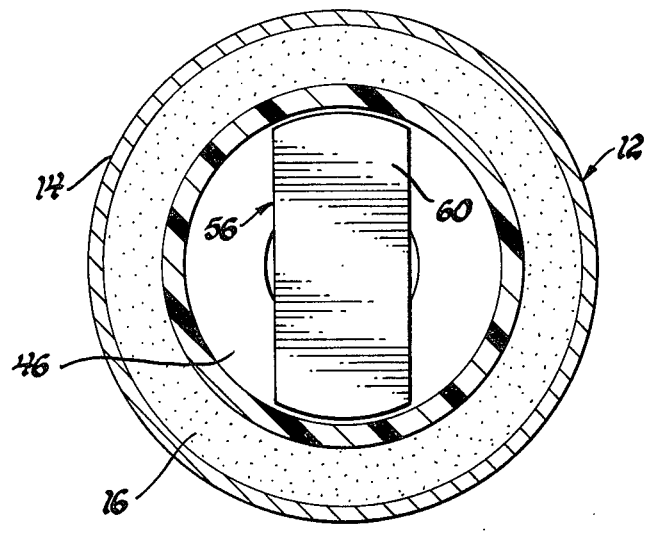
FIG. 2 is a section view taken in the direction of arrows 2—2 of FIG. 1.

The pressure control valve assembly 10 includes a housing 12 having a solenoid containing section 14 and a non-magnetic valve section 16. The solenoid 18 includes a coil wound on a suitable bobbin 20. The coil is provided with electrical terminals 22 and 24 so that it may be connected in a control circuit through which the solenoid is selectively energized and deenergized. A solenoid core 26 extends through coil 18 and bobbin 20 and has a passage 28 extending therethrough. A port 30 in housing section 14 adjacent one end 32 of the core is provided to make a suitable connection to atmospheric air or some similar fluid pressure. A filter 34 is held in position between inlet 30 and core end 32 to prevent the entry of foreign material. The pressure entering port 30 may be air at atmospheric pressure or may be air or some similar fluid at a superatmospheric pressure. For example, the pressure may be provided as exhaust gas back pressure from an internal combustion engine as more particularly disclosed in the application referred to above. The other end 36 of core 26 has a shoulder 38 adjacent thereto and a valve chamber inlet 40 which passes through a valve seat defined by annular valve seat 42 at the end of the core 26.

The housing section 16 defines a valve chamber 44 into which inlet 40 opens. Valve seat 42 extends slightly into chamber 44. A solenoid field plate 46, of annular form, is positioned adjacent core end 36 and surrounds the core end. Field plate 46 has one side extending slightly into chamber 44, but not quite so far into it as does valve seat 42.

A port 48 is connected to fluid pressure inlet 50, which extends through another annular valve seat 52 provided in chamber 44. Port 48, inlet 50, and valve seat 52 may be integrally formed as a part of housing section 16. The valve seat 52 is axially aligned with and spaced from valve seat 42. An outlet port 54 is formed as a part of housing section 16 and communicates with chamber 44 at all times. A valve member 56 is located in chamber 44. The valve member is formed as a reed having sufficient width to cover the valve seats 42 and 52 and sufficient length to be effected by magnetic lines of force passing through the field plate 46 as well as those magnetic lines of force passing through core 26. The valve member 56 acts as a solenoid armature. It is constructed like a sandwich with the major center section 58 being made of a magnetically attractive low remanence material such as low carbon steel. It has thin outer sections or opposite side portions 60 and 62 secured to the center section or portion by some suitable manner such as spot welding. The outer sections are formed of hard nonmagnetic material having high resistance to wear. The material preferably utilized in nonmagnetic stainless steel. The stainless steel layers 60 and 62 substantially prevent wear of the valve member and eliminates the need to provide valve seat closures of a rubber-like material. The thin outer section 60 may be omitted provided care is taken during assembly to insure that section 62 faces field plate 46. By using identical sections 60 and 62 the valve member could not be inadvertently assembled so that the center section 58 would contact valve seat 42 or field plate 46. A spring 64 is under a slight preload and seats on shoulder 38 and valve member 56 to continually urge the valve member toward closure of valve seat 52 and opening of valve seat 42. The space between the valve member section 62 and valve seat 42 establishes the amount of armature travel. It also establishes the amount of opening of either valve seat when the other is closed by the valve member.

When the solenoid is energized, the valve member 56 is magnetically attracted by the magnetic lines of force in the core 26 and the field plate 46 acting in parallel to move the valve member against the force of spring 64 to close valve seat 42 and open valve seat 52. When in this position, the valve member section 62 establishes a magnetic gap between the magnetically attractive center portion 58 and the core 26. When the solenoid is deenergized, this slight magnetic gap assists in immediate removal of the valve member from the valve seat 42 by eliminating any tendency for the valve member to be subject to residual magnetism which would cause erratic valve movement. The release spring 64, while not essential, serves to more sharply define the release time, thus assuring stable valve operation at higher frequencies. The release impact is less than the impact against the core so that a material such as a suitable plastic which is not as hard as otherwise might be the case may be used for the nonmagnetic housing section 16. In many installations, the gaseous fluids being controlled by the valve are non-corrosive, such as atmospheric air at different pressures. In such instances the core 26, field plate 46, and valve member center section 58 may be made of ferromagnetic material. When they may be exposed to a more corrosive fluid, such as engine exhaust gases, however, it is advantageous to utilize nickel, for example, either as a coating or layer on the exposed surfaces or as the primary magnetically soft material. For purposes of disclosure and invention definition, various gaseous fluids may be referred to as air, whether the fluid be atmospheric air, engine exhaust gases, or some artificial environment using one or more other gases or gaseous mixtures.

What is claimed is:

1. A control valve assembly especially for controlling low gaseous fluid pressure differential flows and pressures with a valve opening and closing in a variable duty cycle at variable frequencies, said assembly comprising:
    a housing having a generally circular valve chamber therein and first and second differential gaseous fluid pressure inputs oppositely disposed therein and defining first and second valve seats in aligned spaced relation, one of said inputs extending into said valve chamber and forming therewith an annular chamber section and a gaseous fluid pressure output communicating with said annular chamber section;
    a solenoid assembly including a core and a coil and an annular field plate secured to said housing, said field plate extending into said chamber and surrounding said first input;
    and a valve including a valve element received in said chamber between said valve seats and movable to engage and close either one of said inputs while opening the other to said chamber, said valve including said valve seats and said solenoid core with said first input being through a passage in said core and said first valve seat being formed by a core end, said valve element being of sandwich construction, generally rectangular so as to engage and close said inputs while providing no obstruction to fluid flow between the open one of said inputs and said output through said annular chamber section, and having a major center section of magnetically attractive low remanence material and at least one thin outer section of nonmagnetic material having high resistance to wear and engageable with one of said inputs;
    said solenoid assembly when energized magnetically attracting said valve element to close said first input and open said second input and when deenergized permitting said valve element to open said first input and close said second input.

2. A control valve assembly especially for controlling low air pressure differential flows and pressures with a valve opening and closing in a variable duty cycle at variable frequencies, said assembly comprising:
    a housing having a valve chamber therein and first and second differential air pressure inputs oppositely disposed therein and defining first and second valve seats in aligned spaced relation, one of said inputs extending into said valve chamber and forming therewith an annular chamber section and an air pressure output communicating with said annular chamber section;
    a solenoid assembly including a core and a coil and an annular field plate secured to said housing, said field plate extending into said chamber and surrounding said first input;
    and a valve including a valve element received in said chamber between said valve seats and movable to close either one of said inputs while opening the other to said chamber, said valve including said valve seats and said solenoid core with said first input being through a passage in said core and said first valve seat being formed by a core end, said valve element being of sandwich construction, generally rectangular so as to engage and close said inputs while providing no obstruction to fluid flow between the open one of said inputs and said output through said annular chamber section, and having a major center section of magnetically attractive low remanence material and thin outer sections of nonmagnetic material having high resistance to wear and engageable with one of said inputs;
    said solenoid assembly when energized magnetically attracting said valve element to close said first input and open said second input and when deenergized permitting said valve element to open said first input and close said second input.

3. A solenoid actuated valve assembly having opposed differential fluid pressure inputs formed as valve seats to which differential fluid pressures are provided, and a fluid pressure output, with one input being a tubular solenoid core and having a solenoid field plate adjacent thereto;
    a solenoid armature defining a valve member movable upon solenoid energization and deenergization to alternately open one of said inputs and close the other of said inputs in timed relation within a duty cycle, said valve member being of a sandwich construction and generally rectangular so as to engage and close said inputs while providing no obstruction to fluid flow between the open one of said inputs and said output through said annular chamber section, said valve member having a center portion having a low magnetic remanence characteristic and opposite side portions secured to said center portion and formed of layers having nonmagnetic characteristics and engageable with said inputs, one of said side portions providing a magnetic gap between said center portion and said core and said field plate with the magnetic forces thereacross during solenoid energization acting in parallel through each end of said rectangular valve element;

said solenoid armature center portion and solenoid core and said solenoid field plate having at least a coating of non-corrosive material on all surfaces thereof exposed to fluid being controlled, whereby corrosive fluids such as engine exhaust gases may be utilized as a fluid input.

* * * * *